United States Patent
Gibeau et al.

(10) Patent No.: US 12,054,112 B2
(45) Date of Patent: Aug. 6, 2024

(54) BUMPER BEAM HAVING STEEL REINFORCEMENT

(71) Applicant: ArcelorMittal, Luxembourg (LU)

(72) Inventors: Elie Gibeau, Pont Sainte Maxence (FR); Yannis Kheyati, Saint Denis (FR); Nabil Menegady, Leamington Spa (GB)

(73) Assignee: ARCELORMITTAL, Luxembourg (LU)

(*) Notice: Subject to any disclaimer, the term of this patent is extended or adjusted under 35 U.S.C. 154(b) by 363 days.

(21) Appl. No.: 17/275,666

(22) PCT Filed: Sep. 12, 2019

(86) PCT No.: PCT/IB2019/057691
§ 371 (c)(1),
(2) Date: Mar. 11, 2021

(87) PCT Pub. No.: WO2020/053799
PCT Pub. Date: Mar. 19, 2020

(65) Prior Publication Data
US 2022/0048454 A1    Feb. 17, 2022

(30) Foreign Application Priority Data
Sep. 12, 2018   (WO) .................. PCT/IB2018/056972

(51) Int. Cl.
*B60R 19/18*    (2006.01)
*B60R 19/02*    (2006.01)
*B60R 19/04*    (2006.01)

(52) U.S. Cl.
CPC ............ *B60R 19/18* (2013.01); *B60R 19/023* (2013.01); *B60R 19/04* (2013.01); *B60R 2019/1813* (2013.01)

(58) Field of Classification Search
CPC ....... B60R 19/18; B60R 19/023; B60R 19/04; B60R 2019/1813
See application file for complete search history.

(56) References Cited

U.S. PATENT DOCUMENTS 4,397,490 A * 8/1983 Evans ..................... B60R 19/02
                                                              293/135
5,992,923 A * 11/1999 Wycech ............... B62D 29/002
                                                              280/805

(Continued)

FOREIGN PATENT DOCUMENTS

CN   101570169 A   11/2009
CN   105691334 A   6/2016

(Continued)

OTHER PUBLICATIONS

JP2010023658-A computer translated text, Feb. 2010 (Year: 2010).*
Search Report for PCT/IB2019/057691.
Search Report for PCT/IB2018/056972.

*Primary Examiner* — Amy R Weisberg
*Assistant Examiner* — Melissa Ann Bonifazi
(74) *Attorney, Agent, or Firm* — Davidson Kappel LLC (57) ABSTRACT

A cross member (1) for a bumper beam includes an outer beam (2) with a main beam portion (3) comprising an upper beam wall (12), a lower beam wall (14) and a front beam wall (16), defining together a beam inner volume (17) open in a back direction, a reinforcement element (4) defining a reinforced area (24) of the outer beam (2), located inside a part of said beam inner volume (17) and having a cross section, defining a reinforcement inner volume (25) open in the rear direction, a closing plate (6) closing at least a part of the beam inner volume (17). The cross section of the reinforcement element (4) has a shape which is not matching the shape of the outer beam (2) in the reinforced area (24).

14 Claims, 4 Drawing Sheets

(56) References Cited

U.S. PATENT DOCUMENTS

| | | |
|---|---|---|
| 2005/0285417 A1 | 12/2005 | Heathernigton et al. |
| 2012/0104779 A1 | 5/2012 | Handing et al. |
| 2013/0168982 A1 | 7/2013 | Ashiya et al. |
| 2016/0009236 A1 | 1/2016 | Nilsson |
| 2016/0325701 A1 | 11/2016 | Yabu et al. |
| 2018/0001853 A1 | 1/2018 | Koga et al. |

FOREIGN PATENT DOCUMENTS

| | | | |
|---|---|---|---|
| CN | 106740610 A | | 5/2017 |
| DE | 10327008 B3 | | 1/2005 |
| DE | 102013015420 B4 | | 9/2017 |
| JP | H06321033 A | | 11/1994 |
| JP | H06328988 A | | 11/1994 |
| JP | 2008504162 A | | 2/2008 |
| JP | 2010023658 A | * | 2/2010 |
| JP | 2010023658 A | | 2/2010 |
| JP | 2016064724 A | | 4/2016 |
| KR | 19980012922 U | | 6/1998 |
| KR | 20160082289 A | | 7/2016 |
| KR | 1020160082289 A | | 7/2016 |
| RU | 119303 U1 | | 8/2012 |
| RU | 2529559 C1 | | 9/2014 |
| WO | WO2006012223 A2 | | 2/2006 |
| WO | WO2012124402 A1 | | 9/2012 |
| WO | WO2016117335 A1 | | 7/2016 |
| WO | WO2016163054 A1 | | 10/2016 |

* cited by examiner

BUMPER BEAM HAVING STEEL REINFORCEMENT

The present disclosure concerns a cross member for a bumper beam for an automotive vehicle. The present disclosure further relates to a method for producing such a cross member.

The bumper beam cross member is located at the front and/or at the rear of an automotive vehicle and is generally attached to crash boxes, usually by bolting. The crash boxes are themselves mounted to the vehicle structure. In the case of a front or rear crash, the cross member is the first mechanical element of the vehicle to come into contact with the obstacle. In case of a high-speed crash, the cross member has a function of transmitting the load to the vehicle crash management system. In case of a low speed crash, the crash boxes, on which the cross member is assembled, have a function of absorbing the energy of the crash while protecting the rest of the vehicle structure. In all cases, the cross member is expected to be deformed but not to crack during a crash.

As such, the cross member for the bumper beam needs to be sufficiently resistant to transmit the load of the crash to the crash management system of the vehicle, while at the same time presenting sufficient ductility at the point of impact to be deformed without formation of cracks.

BACKGROUND

In order to ensure the proper behaviour of the cross member during a crash, several standardized tests are defined by official consortiums. For example, the Research Council for Automobile Repair (RCAR) defines a bumper test and a low speed structural crash test. The cross member is also involved in other tests which concern the whole vehicle, such as the "frontal crash full width rigid barrier 50 Km/h" of the Euro NCAP (New Car Assessment Program) and of the IIHS (Insurance Institute for Highway Safety), also known as the full-frontal crash test.

Furthermore, car manufacturers also define their own testing procedures to further improve the evaluation of the cross member. Such tests are not standardized and not publicly available. However, it is known that many car manufacturers have defined a test known as a pole impact test, in which the vehicle is crashed at a low speed, for example around 10 Km/h, against a rigid pole located in the middle of the width of the vehicle. Such a test is intended to simulate small impacts when manoeuvring a vehicle at a low speed.

During such a test, the center portion of the cross member needs to have sufficient ductility at the point of impact in order to deform without cracking under the very localized load applied by the pole during the impact. On the other hand, taking into account for example the full-frontal crash test, the full width of the cross member needs to have sufficient mechanical resistance in order to not fail under the very high load applied by the obstacle and to transmit the energy of the impact to the vehicle crash management system.

It is known from the prior art to include in the design of the shape of the cross member one or more beads, intended to increase the resistance of the cross member to the compressive loads of a crash by delaying the onset of buckling.

It is also known from the prior art to manufacture such a cross member using at least an outer beam and a reinforcement element inserted inside the center portion of the outer beam, said reinforcement element having a cross section which has a shape substantially matching the shape of the outer beam. The reinforcement element serves to increase the energy absorption capacity of the bumper beam in the center portion, which is the region submitted to the highest amount of stresses for example in the case of the pole impact test.

However, having a matching cross section shape between the outer beam and the reinforcement element induces limitations in the design of the shape of the inner reinforcement, raises difficulties in the manufacturing process of the outer beam and the reinforcement element and also raises difficulties in the assembly process of said outer beam and said inner reinforcement. Indeed, because the shape of the reinforcement matches the shape of the outer beam, the assembly of both parts will require very high geometrical tolerance of said parts, because both parts must come into contact over a large amount of their surface area. When manufacturing such parts with advanced high strength steel for example, it is known that it is difficult to obtain a very high geometrical tolerance because of springback. Therefore, the manufacturing process of such parts will require specific, costly and time-consuming steps to reach the required geometrical precision. The assembly step will also require specific precautions such as for example high strength clamping of both parts together. Furthermore, the shape of the reinforcement element is not optimized in terms of energy absorption capacity.

SUMMARY

One of the aims of the present disclosure is to overcome these limitations by providing a cross member for a bumper beam which is optimized in terms of energy absorption and which do not require specific precautions during the manufacturing steps.

To this end, the present disclosure provides a cross member for a bumper beam for an automotive vehicle comprising:
  an outer beam extending along a transverse direction with
    a main beam portion comprising an upper beam wall, a lower beam wall and a front beam wall connecting the upper beam wall and the lower beam wall, said upper beam wall, lower beam wall and front beam wall defining together a beam inner volume open in a back direction opposite to the front beam wall,
  a reinforcement element defining a reinforced area of the outer beam, located inside a part of said beam inner volume and having a cross section, defining a reinforcement inner volume open in the rear direction,
  a closing plate closing at least a part of the beam inner volume,
  wherein the cross section of the reinforcement element has a shape which is not matching the shape of the outer beam in the reinforced area,
  wherein the reinforcement element comprises at least an upper reinforcement wall linked to a first intermediate reinforcement wall by an upper joining wall, said first intermediate reinforcement wall being joined to a second intermediate reinforcement wall by a central joining wall and said second intermediate reinforcement wall being linked to a lower reinforcement wall by a lower joining wall, said upper and lower joining walls facing the front beam wall of the outer beam and said central joining wall facing the open side of the outer beam.

Because the cross section of the outer beam and the reinforcement element have a different shape and are not matching one another in the reinforced area, it is possible to design them separately, taking into account the specific requirements of each part. In particular, it is possible to design the reinforcement element to have a M shaped cross-section opened towards the back direction, which is an optimized shape to optimize the energy absorption during a crash and to optimize the production costs of the reinforcement element. Moreover, it is not necessary to take costly measures in order to ensure a very high geometrical tolerance between the outer beam and the reinforcement element and in order to assemble these parts together.

According to other optional features of the cross member according to the present disclosure, considered alone or according to any possible technical combination:
- the closing plate fully closes the reinforcement inner volume,
- the width of the reinforced area along the transverse direction is less than the width of the outer beam along said transverse direction,
- the width of the reinforced area along the transverse direction is comprised between 30% and 80% of the width of the main beam portion of the outer beam along said transverse direction,
- the width of the closing plate along the transverse direction is comprised between 50% and 100% of the width of the main beam portion of the outer beam along said transverse direction,
- the reinforcement element comprises at least one of the reinforcement walls forms an angle comprised between 75° and 105° with the front beam wall of the outer beam,
- at least the central joining wall abuts the closing plate,
- said central joining wall and closing plate are attached together,
- the reinforcement element has a constant cross section along the transverse direction,
- the outer beam comprises an upper beam flange and a lower beam flange, said beam flanges and extending on either side of the upper beam wall and of the lower beam wall of said outer beam, the reinforcement element comprising an upper reinforcement flange and a lower reinforcement flange, said reinforcement flanges being attached to said beam flanges in the reinforced area,
- the closing plate is attached to the reinforcement flanges and to the beam flanges and in the reinforced area and is attached to said beam flanges and only outside of said reinforced area,
- the closing plate comprises at least one opening outside of the reinforced area and does not comprise any openings inside said reinforced area,
- the outer beam is a hot stamped formed steel sheet,
- the outer beam is a hot stamped formed tailor welded steel blank comprising a central beam portion and two side beam portions extending on either side of said central beam portion in a transverse direction, the width of the central beam portion along the transverse direction being equal or greater than the width of the reinforced area along said transverse direction,
- the central beam portion has a higher crash ductility than the side beam portions,
- the central beam portion has a crash ductility of at least 0.6 and a maximum bending angle of at least 75°,
- the outer beam has an ultimate tensile strength of at least 950 MPa,
- the reinforcement element has an ultimate tensile strength of at least 500 MPa, and
- the closing plate has an ultimate tensile strength of at least 500 MPa.

The present disclosure also provides a method for producing a cross member, as described above, comprising the steps of:
- providing an outer beam,
- providing a reinforcement element,
- providing a closing plate,
- attaching the reinforcement element to the outer beam in a reinforced area of said outer beam,
- attaching the closing plate to the reinforcement element and to the outer beam in the reinforced area.

According to other optional features of the method according to the present disclosure, considered alone or in any possible technical combination:
- the closing plate is further attached to only the outer beam outside of the reinforced area,
- the outer beam is hot stamped from a steel sheet,
- the outer beam is hot stamped from a tailor welded blank or a tailor rolled blank comprising a central blank portion and two side blank portions extending on either side of said central blank portion in the transverse direction, and
- the reinforcement element is formed by roll forming of a steel blank.

BRIEF SUMMARY OF THE DRAWINGS

Other aspects and advantages of the present disclosure will appear upon reading the following description, given by way of example, and made in reference to the appended drawings, wherein.

DETAILED DESCRIPTION

In the following description, the terms "upper", "lower", "front", "rear", "transverse" and "longitudinal" are defined according to the usual directions of a mounted vehicle. More particularly, the terms "upper" and "lower", are defined according to the elevation direction of the vehicle, the terms "front", "rear" and "longitudinal" are defined according to the front/rear direction of the vehicle and the term "transverse" is defined according to the width of the vehicle. By "substantially parallel" or "substantially perpendicular" it is meant a direction which can deviate from the parallel or perpendicular direction by no more than 15°.

More particularly, the term "fracture strain", also known as "crash ductility" and the term "critical bending angle", also known as "maximum bending angle" refer to the fracture strain criterion and the critical bending angle criterion defined by Pascal Dietsch et al. in "Methodology to assess fracture during crash simulation: fracture strain criteria and their calibration", in Metallurgical Research Technology Volume 114, Number 6, 2017. The critical bending angle (also known as maximum bending angle) defines the angle at which the first cracks are detected on the extrados of a sample which has been deformed according to the standardized VDA-238-100 Standard. The fracture strain (also known as crash ductility) is the associated equivalent strain within the material at the point of the deformation when the critical bending angle has been reached.

Figure 1:
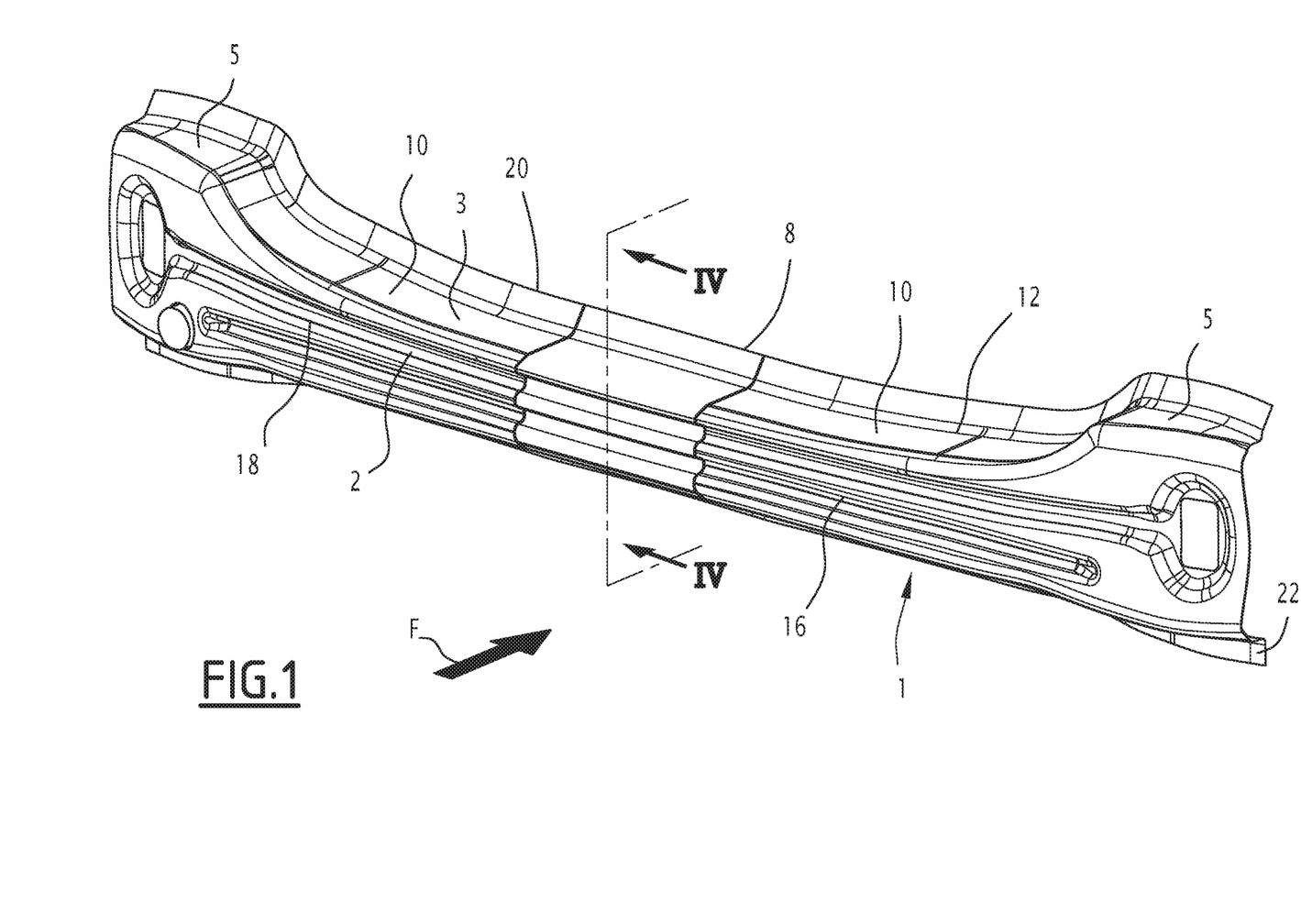
FIG. 1 is an overall front perspective view of a cross member according to an embodiment of the present disclosure.
Figure 2:
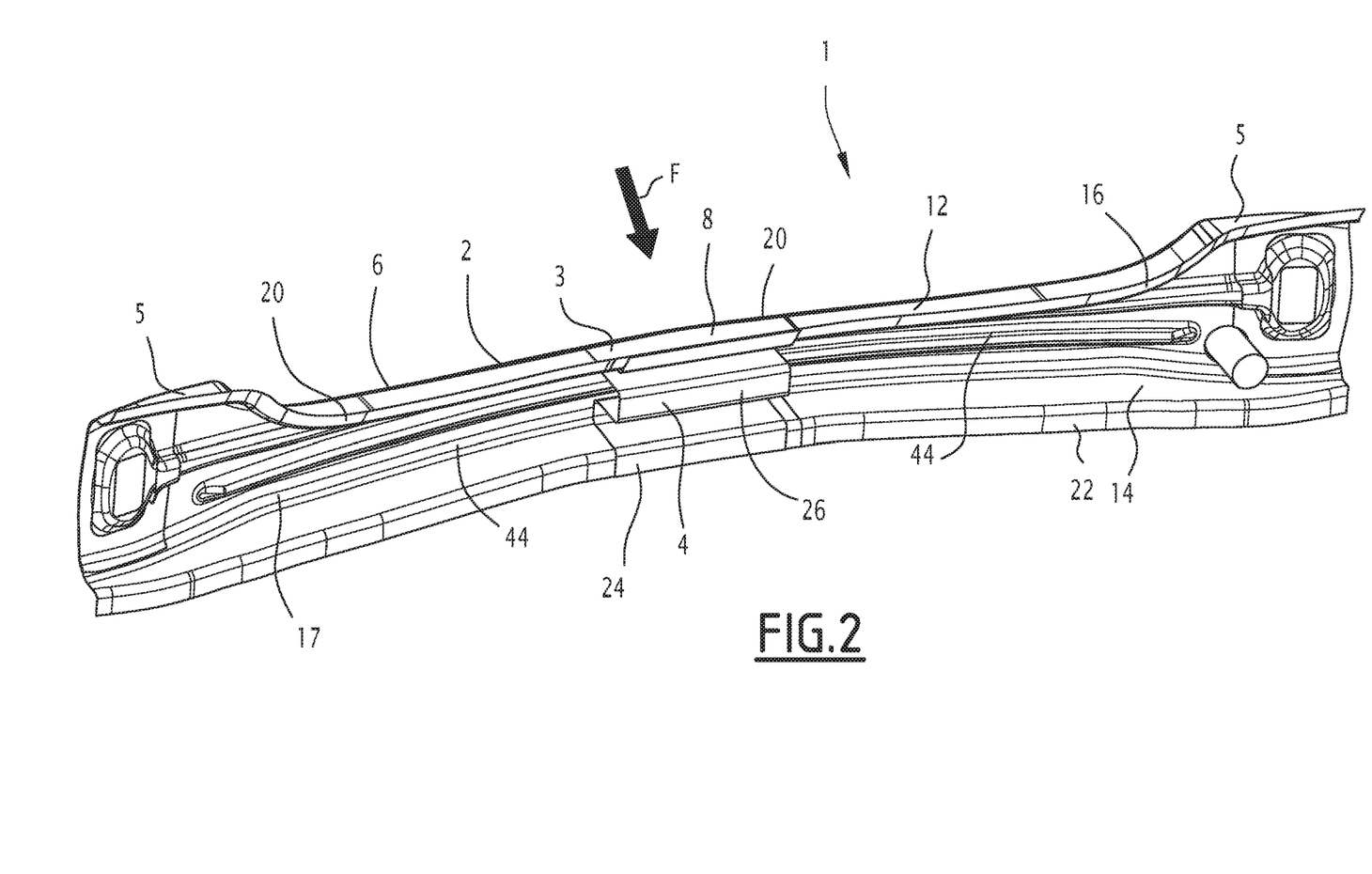
FIG. 2 is an overall rear perspective view of the cross member of FIG. 1.
Figure 4:
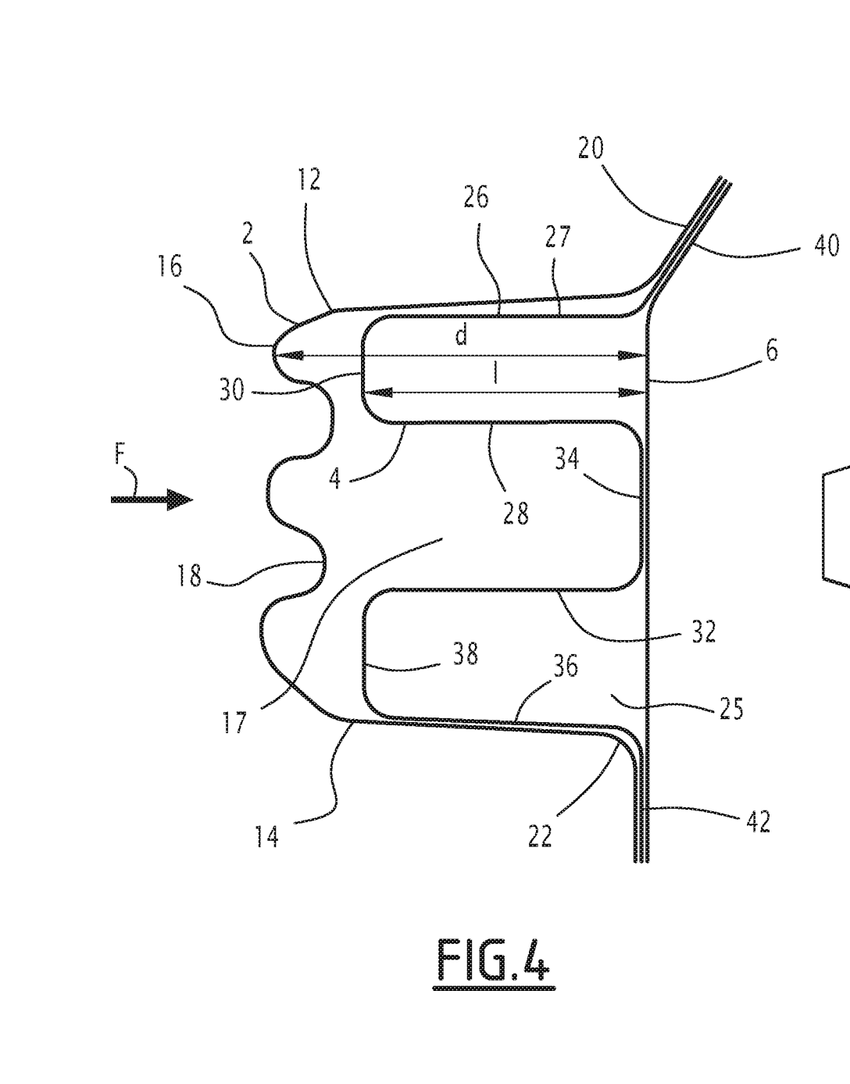
FIG. 4 is a cross section view along axis IV-IV of FIG. 1.

Referring to FIGS. 1 and 2, a cross member 1 for a bumper beam of an automotive vehicle is described. The cross member 1 comprises an outer beam 2, a reinforcement element 4 and a closing plate 6. The cross member is generally attached to the rest of the vehicle on either side of the outer beam 2, for example via a set of two crash boxes (not depicted on the drawings). During a front crash in the case of a front cross member 1 or during a rear crash in the case of a rear cross member 1, the cross member 1 is subjected to a compressive impact force F as depicted in FIGS. 1, 2 and 4.

The outer beam 2 extends along a transverse direction and comprises a main beam portion 3 and two beam end portions 5 extending on either side of the main beam portion 3 along the transverse direction. The shape of the outer beam 2 in said beam end portions 5 can be flat or of any other shape suitable for the assembly of the cross member 1 to the rest of the vehicle body, and in particular to crash boxes. The main beam portion 3 serves to absorb the energy of the compressive impact force F and to resist the intrusion into the vehicle by transmitting said compressive impact force F to the vehicle crash management system. The main beam portion 3 comprises an upper beam wall 12 and a lower beam wall 14, both substantially perpendicular to the elevation direction of the vehicle and a front beam wall 16, joining said upper and lower beam wall 12 and 14 and being substantially perpendicular to said upper and lower beam walls 12 and 14. When the cross member 1 is mounted on a vehicle, the upper and lower beam walls 12, 14 are for example substantially horizontal. According to a variant, the upper and lower beam walls extend according to diverging directions from the front beam wall 16 toward the back of the cross member 1.

The upper beam wall 12, lower beam wall 14 and front beam wall 16 define together a beam inner volume 17, which is open facing a back direction opposite to the front beam wall 16. In case of a front cross member, the back direction is oriented toward the rear of the vehicle and, in case of a rear cross member, the back direction is oriented toward the front of the vehicle.

According to a particular embodiment, the outer beam 2 has a minimum ultimate tensile strength of 950 MPa in order to resist the high stresses during a crash.

Figure 3:
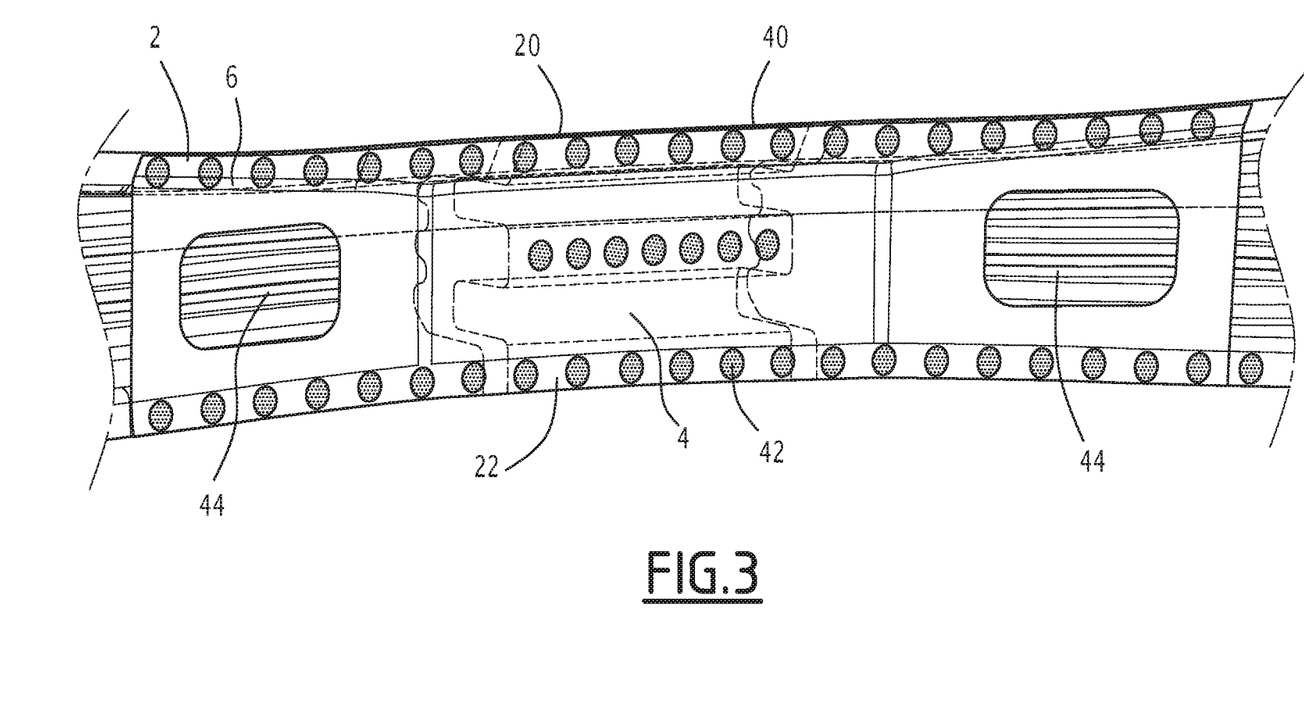
FIG. 3 is a rear view of the central part of the cross member of FIG. 1.

According to a particular embodiment, visible in FIGS. 1 to 3, the main beam portion further comprises a central beam portion 8 and two side beam portions 10 extending along either side of the central beam portion 8 in the transverse direction, said central beam portion 8 having a higher crash ductility than said side beam portions 10. In this embodiment, the central beam portion 8 will advantageously accommodate for the very high stress concentration in the center of the cross member 1 during the pole impact test by deforming without cracking thanks to its high crash ductility, while the side beam portions 10 will resist deformation, thereby ensuring the physical integrity of the cross member during such pole impact test or during a higher speed impact test.

According to an embodiment, the outer beam 2 is made from a hot stamped tailor welded blank.

The outer beam 2 is for example a press-hardened steel part. More particularly, the central beam portion 8 is for example made of a press-hardening steel having a carbon content comprised between 0.06 wt. % and 0.1 wt. % and a manganese content comprised between 1.4 wt. % and 1.9 wt. %. Even more particularly, the steel composition of the central beam portion 8 may further comprise Nb, Ti, B as alloying elements. The central beam portion 8 is for example made of Ductibor 1000®, which has a crash ductility of at least 0.6, a maximum bending angle of at least 75°, an ultimate tensile strength above 1000 MPa and a yield strength comprised between 700 and 950 MPa.

Each side beam portion 10 is for example made of a press-hardening steel having a tensile strength greater than 1300 MPa. According to an embodiment, the steel composition of the side beam portions 10 comprises for example, in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration. With this composition range, the tensile strength of the side beam portions 10 after press-hardening is comprised between 1300 and 1650 MPa.

According to another embodiment, the steel composition of the side beam portions 10 comprises for example, in % weight: 0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from the elaboration. With this composition range, the tensile strength of the side beam portions 10 after press-hardening is higher than 1800 MPa.

For example, the side beam portions 10 are made of Usibor 1500® or Usibor 2000®.

According to a particular embodiment, visible in FIGS. 1 to 4, the main beam portion 3 of the outer beam 2 further comprises an upper beam flange 20 extending in a transverse direction along a back end of the upper beam wall 12 and a lower beam flange 22 extending in a transverse direction along a back end of the lower beam wall 14. The back ends of the upper and lower beam walls 12, 14 each extend opposite to the front beam wall 16 in the back direction. Such upper and lower beam flanges 20 and 22 can advantageously serve to assemble different parts of the cross member 1 as will be described in greater detail subsequently.

According to a further particular embodiment, as shown in FIG. 1, the front beam wall 16 comprises beads 18 each extending along the transverse direction over at least part of the width of the outer beam 2 and positioned one above the others in the elevation direction. Said beads 18 can advantageously increase the resistance of the outer beam 2 under compressive loading by delaying the onset of buckling, because their geometry comprises elements which are substantially parallel to the compressive impact force F during a crash.

The reinforcement element 4, depicted in FIGS. 1 to 4, extends inside a part of the beam inner volume 17, defining a reinforced area 24 of the outer beam 2, and defining a reinforcement inner volume 25 comprised within the beam inner volume 17 and which is open facing the back direction. The reinforcement element 4 is a part distinct from the outer beam 2 and attached to said outer beam 2 in the reinforced area 24.

In a particular embodiment, the reinforced area 24 extends in at least a part of the central beam portion 8 of the outer beam 2. Advantageously, the reinforcement element 4 serves to increase the amount of energy absorbed in the reinforced area 24 located in the central beam portion 8 of the outer beam 2, which is the area subjected to the highest amount of stresses during the pole impact test. In another particular embodiment in which the central beam portion 8 has a higher crash ductility than the side beam portions 10, thereby preventing crack formation during low speed impacts at the center of the cross member 1, but also introducing a weakness in the mechanical resistance of said central beam portion 8, the reinforcement element 4 also serves to increase the mechanical resistance of the reinforced area 24 during a high-speed crash such as the full-frontal crash test.

In a particular embodiment, the reinforced area 24 has a smaller width along the transverse direction than the width of the outer beam 2. In a further particular embodiment, the width of the reinforced area 24 is comprised between 30% and 80% of the width of the main beam portion 3 of the outer beam 2. For example, the width of the reinforced area 24 is substantially equal to the width of the central beam portion 8 and the localization of the reinforced area 24 coincides with the central beam portion 8. The minimum width of the reinforced area 24 is defined by the need for the reinforcement element 4 to act efficiently in absorbing energy at the center of the cross member 1 during a crash. On the other hand, the maximum width of the reinforcement element 4 is defined by the need to minimize the amount of material engaged, in order to minimize the production costs and to minimize the weight of the cross member 1. The cross section of the reinforcement element 4, in a plane comprising the elevation direction and the longitudinal direction, has a shape which is different from and does not match the shape of the outer beam 2 in the reinforced area 24, as shown in FIG. 4. Advantageously, this means that the cross section of the reinforcement element 4 can be optimized to absorb as much energy as possible during a crash, independently of the shape of the outer beam 2. More particularly, when the outer beam 2 comprises beads 18, the shape of the reinforcement element 4 can be independent from the shape of said beads 18.

The reinforcement element 4 comprises at least four reinforcement walls 27, at least one of which forming an angle comprised between 75° and 105° with the front beam wall 16 of the outer beam 2. For example, one of the reinforcement walls 27 forms an angle of 90° with the general direction of front beam wall 16. According to an embodiment, all reinforcement walls form an angle comprised between 75° and 105° with the from beam wall 16 of the outer beam 2. The reinforcement walls 27 are arranged to deform in case of an impact against the outer beam 2, which contributes to increase the energy absorbed during a crash thanks to the orientation of the reinforcement walls 27 which is substantially parallel to the orientation of the compressive impact force F. In order to have an optimal energy absorption, at the localization of the reinforcement walls 27 in a part of the reinforced inner volume 25, the reinforcement walls 27 have a length l, in a direction parallel to the compressive impact force F, which is as close as possible to the distance d between the front beam wall 16 and the back end of said part of the reinforced inner volume 25 in said direction, as shown in FIG. 4. The length l of the reinforcement walls 27 is for example comprised between 50% and 100% of the distance d between the front beam wall 16 and the back end of the part of the reinforced inner volume 25 in which said reinforcement walls 27 extend. It should be noted that in order to take into account the geometrical tolerances linked to the manufacturing process of the parts, it is preferable to allow in the design of the parts for a minimum gap of at least 1 mm between the distance d and the length l. such that the distance d will be at least greater than the length l on the mounted vehicle. Indeed, if the distance d and the length l are designed to be exactly equal, there is a risk that due to dispersions in the manufacturing process, the effective length l of the reinforcement walls 27 of the manufactured reinforcement element 4 would actually be greater than the effective distance d between the front wall 16 and the back end of the reinforcement inner volume 25 of the manufactured outer beam 2, in which case it would not be possible to fit the reinforcement element 4 within the reinforcement inner volume 25. As depicted on FIG. 4, the reinforcement element 4 comprises several reinforcement walls 26, 28, 32 and 36, and more particularly at least an upper reinforcement wall 26 linked to a first intermediate reinforcement wall 28 by an upper joining wall 30, said first intermediate reinforcement wall 28 being joined to a second intermediate reinforcement wall 32 by a central joining wall 34 and said second intermediate reinforcement wall 32 being linked to a lower reinforcement wall 36 by a lower joining wall 38, said upper and lower joining walls 30 and 38 facing the front beam wall 16 of the outer beam 2 and said central joining wall 34 facing the back side of said outer beam 2, opposite to the front beam wall 16. In other words, the reinforcement element 4 has a M shaped cross-section opened towards the back direction. Advantageously, such a reinforcement element 4 comprises at least four reinforcement walls 26, 28, 32, 36 substantially parallel to each other and to the compressive impact force F. It should be noted that the greater the number of reinforcement walls 26, 28, 32, 36 the higher the energy absorption in case of a crash. It is understood that, when the reinforcement element 4 comprises more than four reinforcement walls, the reinforcement element 4 will also comprise as many intermediate reinforcement walls facing the front beam wall 16 and as many central reinforcement walls 34 facing the back end of the reinforced area 24 as necessary to join the reinforcement walls together. The reinforcement walls may all have the same length l in a direction parallel to the compressive impact force F. In a variant, the reinforcement walls have different lengths l arranged to be as close as possible to the distance d between the front beam wall 16 and the back end of the parts of the reinforced inner volume 25 in which said reinforcement walls extend. When the cross member 1 is mounted on a vehicle, the reinforcement walls for example extend in substantially horizontal planes.

In a particular embodiment, the reinforcement element 4 has a constant cross section extending along the transverse direction. Advantageously, this enables to manufacture the reinforcement element 4 using a very productive and cost-effective process, as will be detailed subsequently.

In a particular embodiment, the reinforcement element 4 comprises an upper flange 40 extending in a transverse direction along a back end of the upper reinforcement wall 26 and a lower flange 42 extending in a transverse direction along a back end of the lower reinforcement wall 36. The back ends of the upper and lower reinforcement walls 26 and 36 each extend opposite to the front beam wall 16 in the back direction. Such upper and lower reinforcement flanges 40 and 42 can advantageously serve to assemble different parts of the cross member 1 as will be described in greater detail subsequently.

The fact that the reinforcement element 4 has a M shaped cross-section opened towards the back direction allows having four reinforcement walls, which guarantees a maximum energy absorption during a crash, and allows to attach the reinforcement element to the outer beam by attaching the upper and lower reinforcement flanges extending along the back end of the upper and lower reinforcement walls to the outer beam flanges, as will be explained subsequently.

In a further particular embodiment, the reinforcement element 4 has an ultimate tensile strength of at least 500 MPa. Advantageously, the reinforcement element 4 thus has a high amount of strength in order to efficiently absorb energy during a crash.

The closing plate 6, depicted in FIGS. 2 3 and 4, is attached to at least the outer beam 2. The closing plate 6 has a width in the transverse direction which is at least equal to the width of the reinforced area 24. During a crash, as a result of the compressive impact force F applied to the front beam wall 16, the outer beam 2 has a tendency to open itself in the elevation direction, in other words the compressive impact force F acts to increase the angle between the upper beam wall 12 and the front beam wall 16 and to increase the angle between the lower beam wall 14 and the front beam wall 16. In other words, in case of an impact, the upper and lower beam walls 12 and 14 tend to move away from one another in diverging directions. Such an opening of the outer beam 2 has the effect of lowering the amount of energy absorbed by the cross member 1 because the upper and lower walls 12 and 14 are pried away from the direction of the compressive impact force F instead of staying parallel to said compressive impact force F. In other words, the energy absorbed through the unbending motion of the outer beam 2 by the compressive impact force F, when said compressive impact force F is allowed to pry open said outer beam 2, is far less than the energy absorbed by the resistance to said compressive impact force F of the lower and upper walls 12 and 14, when said walls 12 and 14 stay substantially parallel to the compressive impact force F during a crash. Advantageously, the closing plate 6 attached to the outer beam 8 counteracts this opening effect of the compressive impact force F and ensures that the upper and lower walls 12 and 14 stay substantially parallel to the impact force F during a crash. According to an embodiment, the width of the closing plate 6 along the transverse direction is comprised between 50% and 100% of the width of the main beam portion 3 of the outer beam 2 along said transverse direction in order to have at least a sufficient attachment surface between the closing plate 6 and the outer beam 2.

In a particular embodiment, the closing plate 6 fully closes the reinforced area 24. In other words, the closing plate 6 closes the beam inner volume 17 in the back direction at least in the reinforced area 24 and has no openings in said reinforced area. In this case, during a crash, the reinforcement element 4 will be pushed against the closing plate 6, eventually touching the closing plate 6 if the compressive impact force F is sufficiently high. Advantageously, the contact between the reinforcement element 4 and the closing plate 6 and the subsequent crushing of the reinforcement element 4 onto the closing plate 6 increases the amount of energy absorbed by the cross member 1.

In a particular embodiment, the reinforcement element 4 abuts the closing plate 6 on at least part of one central joining wall 34 of the reinforcement element 4, before the cross member 1 has even been submitted to the compressive impact force F. In effect, this provokes right at the onset of the crash the above described crushing effect of the reinforcement element 4 on the closing plate 6 and therefore further increases the amount of energy absorbed by the cross member 1 during a crash. According to an embodiment, when the reinforcement element 4 comprises more than one central joining wall 34, the reinforcement element 4 may abut the closing plate 6 on at least part of one or more of said central joining walls 34.

In a particular embodiment, the reinforcement element 4 and the closing plate 6 are attached together in at least part of one central joining wall 34 of the reinforcement element 4. The reinforcement element 4 and the closing plate 6 can be attached by welding or bolting or any other possible fastening means. Advantageously, when the closing plate 6 and the reinforcement element 4 are attached in one central joining wall 34, said central joining wall 34 cannot slip on the closing plate under the effect of the compressive impact force F. The reinforcement element 4 will thus necessarily be crushed onto the closing plate 6, thereby imparting more robustness to the increase in energy absorption coming from the collaboration between the closing plate 6 and the reinforcement element 4. Furthermore, because the reinforcement element 4 is already fastened to the outer beam 2, attaching a central joining wall 34 of said reinforcement element 4 to said closing plate 6 will advantageously further prevent the opening of the outer beam 2 under the effect of the compressive impact force F. According to an embodiment, when the reinforcement element 4 comprises more than one central joining wall 34, the reinforcement element 4 may also be attached to the closing plate 6 in at least part of one or more of said central joining walls 34.

In a preferred embodiment, the closing plate 6 comprises at least one opening 44 outside of the reinforced area 24, and is fully closed inside the reinforced area 24, as depicted in FIGS. 2 and 3. Advantageously, this will decrease the weight of the cross member 1, while still ensuring the good collaboration between said closing plate 6 and the reinforcement element 4 during a crash and a sufficient attachment surface between the closing plate 6 and the outer beam 2.

In a further preferred embodiment, the closing plate 6 has an ultimate tensile strength of at least 500 MPa, in order to advantageously resist to the opening effect of the impact compressive force F and in order to advantageously collaborate with the reinforcement element 4 to increase the amount of absorbed energy.

It should be noted that, as already known, the outer beam 2 may have a curved shape along the transverse direction. In this case, the reinforcement element 4 and the closing plate 6 may also have a corresponding curved shape along the transverse direction.

The cross member for a bumper beam described above, comprising an outer beam and a reinforcement element having a different shape, which does not match the shape of the outer beam, presents multiple advantages, among which the freedom of choice in the design of the shape of the outer beam and the reinforcement element, which allows to optimize separately the shape of each part according to their specific requirements, such as energy absorption, costs and weight saving.

Another advantage of said cross member is the freedom to choose the most appropriate production process to manufacture said outer beam and said reinforcement element according to the performance requirement of each part and taking also into consideration the productivity and cost of the manufacturing process. Furthermore, having different and non-matching cross sections between the outer beam and the reinforcement element, allows for easier assembly of both parts, as will be seen in the description of the method for producing the above described cross member.

The method comprises a step of providing an outer beam 2. For example, the outer beam 2 is made by hot stamping of a steel blank 46. In a particular embodiment of the present disclosure shown in FIG. 5, the outer beam 2 is made by hot stamping of a tailor welded blank having a central blank portion 48 and two side blank portions 50 extending in a transverse direction on either side of said center blank portion 48. After hot stamping, the central blank portion 48 and the side blank portions 50 will correspond respectively to a central beam portion 8 and two side beam portions 10. For example, as described above, said central beam portion 8 is made of Ductibor 1000® and said side beam portions 10 are made of Usibor 1500®. Advantageously, this allows to produce in a single step an outer beam 2 comprising a central beam portion 8 having a high crash ductility and two side beam portions 10 having a very high mechanical resistance. Furthermore, by choosing a steel grade having a very high mechanical resistance for the side beam portions 10, it is possible to reach a high mechanical resistance of the side beam portions 10 with a low thickness of steel, thereby contributing to minimizing the weight of the cross member 1.

Figure 5:
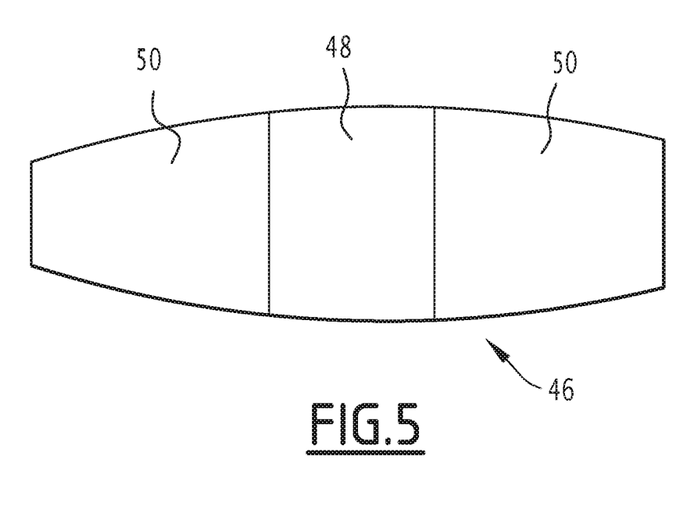
FIG. 5 is a front view of a blank for forming the outer beam of a cross member according to an embodiment of the present disclosure.

According to a variant, the outer beam 2 is made by hot stamping of a tailored roll blank. The method further comprises a step of providing a reinforcement element 4. In a particular embodiment, said reinforcement element 4 has a constant cross-section extending along the transverse direction. In this case, the reinforcement element 4 is for example made by roll forming of a steel blank, which is a very productive and cost effective forming process.

The method further comprises a step of providing a closing plate 6.

The method further comprises a step of attaching the reinforcement element 4 to the outer beam 2 in a reinforced area 24 of said outer beam 2. For example, the reinforcement element 4 is attached to the outer beam 2 by fastening an upper reinforcement flange 40 onto an upper beam flange 20 and by fastening a lower reinforcement flange 42 onto a lower beam flange 22, by welding, mechanical joining or any other possible fastening technology. Advantageously, because the flanges 20, 22, 40 and 42 correspond to substantially flat areas of the parts that are not deformed or only slightly deformed during the forming process of the parts, it is easy to ensure a good geometrical precision in these areas and therefore easy to ensure a good contact between the parts in the flange areas during the assembly step.

The method further comprises a step of attaching the closing plate 6 to the reinforcement element 4 in the reinforced area 24. For example, the closing plate 6 is fastened to the reinforcement element 4 by welding, mechanical joining or any other possible fastening technology on the upper and lower reinforcement flanges 40 and 42. In a particular embodiment, the above described assembly steps of the reinforcement element 4 to the outer beam 2 and of the closing plate 6 to the reinforcement 4 in the reinforced area 24 are realized in the same step, using the flanges 20, 22, 40 and 42 as attachment areas between the three parts in the reinforced area 24, for example by multi-layer welding. Advantageously, thus combining two assembly steps in a single step reduces the assembly time, thereby increasing productivity and decreasing process costs.

In a particular embodiment, the closing plate 6 is further attached to the outer beam 2 outside of the reinforced area 24. For example, the closing plate 6 is attached to the upper and lower beam flanges 20 and 22 outside of the reinforced area 24.

In a particular embodiment, the closing plate 6 is attached to at least one intermediate joining wall 34 of the reinforcement element 4.

In a further particular embodiment, the forming process of the closing plate 6 comprises the formation of at least one opening 44 in said closing plate 6, outside of the reinforced area 24.

In a further particular embodiment, the central beam portion 8 is made of Ductibor 1000® having a thickness between 1.3 mm and 1.7 mm, for example 1.5 mm, the side beam portions 10 are made of Usibor 1500® having a thickness between 0.8 mm and 1.2 mm, for example 1.05 mm, the reinforcement element 4 is made of a steel having an ultimate tensile strength above 950 MPa and having a thickness between 0.5 mm and 0.9 mm, for example 0.7 mm, and the closing plate 6 is made of a steel having an ultimate tensile strength above 950 MPa and having a thickness between 0.5 mm and 0.9 mm, for example 0.7 mm.

The cross member 1 is then integrated in the rest of the automotive vehicle by fastening it to the vehicle body, for example by bolting it to crash boxes.

The invention claimed is:

1. A cross member for a bumper beam for an automotive vehicle comprising:
    an outer beam extending along a transverse direction with a main beam portion comprising an upper beam wall, a lower beam wall and a front beam wall connecting the upper beam wall and the lower beam wall, the upper beam wall, lower beam wall and front beam wall defining together a beam inner volume open in a back direction opposite to the front beam wall;
    a reinforcement element defining a reinforced area of the outer beam, the reinforcement element located inside a part of the beam inner volume and having an M shaped cross section, the M shaped cross section of the reinforcement element defining a reinforcement inner volume opened towards the back direction; and
    a closing plate closing at least a part of the beam inner volume,
    the cross section of the reinforcement element having a shape which is not matching the shape of the outer beam in the reinforced area,
    the reinforcement element comprising at least an upper reinforcement wall linked to a first intermediate reinforcement wall by an upper joining wall, the first intermediate reinforcement wall being joined to a second intermediate reinforcement wall by a central joining wall and the second intermediate reinforcement wall being linked to a lower reinforcement wall by a lower joining wall, the upper and lower joining walls facing the front beam wall of the outer beam and the central joining wall facing the open side of the outer beam,
    a length of the upper reinforcement wall, the first intermediate reinforcement wall, the second intermediate reinforcement wall and the lower reinforcement wall in a direction parallel to a compressive impact force, is as close as possible to the distance between the front beam wall and a back end of said part of the reinforced inner volume in said direction.

2. The cross member according to claim 1, wherein the closing plate fully closes the reinforcement inner volume.

3. The cross member according to claim 1, wherein a width of the reinforced area along the transverse direction is comprised between 30% and 80% of a width of the main beam portion of the outer beam along the transverse direction.

4. The cross member according to claim 1, wherein the width of the closing plate along the transverse direction is comprised between 50% and 100% of the width of the main beam portion of the outer beam along the transverse direction.

5. The cross member according to claim 1, wherein at least the central joining wall abuts the closing plate.

6. The cross member according to claim 5, wherein the central joining wall and the closing plate are attached together.

7. The cross member according to claim 1, wherein the closing plate comprises at least one opening outside of the reinforced area and does not comprise any openings inside the reinforced area.

8. The cross member according to claim 1, wherein the outer beam is a hot stamped formed steel sheet.

9. The cross member according to claim 1, wherein the outer beam is a hot stamped formed tailor welded steel blank comprising a central beam portion and two side beam portions extending on either side of the central beam portion in the transverse direction, the width of the central beam portion along the transverse direction being equal or greater than the width of the reinforced area along the transverse direction.

10. The cross member according to claim 9, wherein the central beam portion has a higher crash ductility than the side beam portions.

11. The cross member according to claim 10, wherein the central beam portion has a crash ductility of at least 0.6 and a maximum bending angle of at least 75°.

12. The cross member according to claim 1, wherein the outer beam has an ultimate tensile strength of at least 950 MPa.

13. The cross member according to claim 1, wherein the reinforcement element has an ultimate tensile strength of at least 500 MPa.

14. The cross member according to claim 1, wherein the closing plate has an ultimate tensile strength of at least 500 MPa.

* * * * *